(12) United States Patent
Natarajan et al.

(10) Patent No.: US 10,505,990 B1
(45) Date of Patent: Dec. 10, 2019

(54) METHODS FOR DETERMINISTIC ENFORCEMENT OF COMPLIANCE POLICIES AND DEVICES THEREOF

(71) Applicant: F5 Networks, Inc., Seattle, WA (US)

(72) Inventors: Ravi Natarajan, Fremont, CA (US); Joel Moses, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 21 days.

(21) Appl. No.: 15/411,037

(22) Filed: Jan. 20, 2017

Related U.S. Application Data (60) Provisional application No. 62/280,751, filed on Jan. 20, 2016.

(51) Int. Cl.
    *H04L 29/06* (2006.01)
(52) U.S. Cl.
    CPC .................... *H04L 63/205* (2013.01)
(58) Field of Classification Search
    CPC ....... H04L 63/05; H04L 63/20; H04L 63/102; H04L 63/108
    USPC ............................................................ 726/1
    See application file for complete search history.

(56) References Cited

U.S. PATENT DOCUMENTS

| | | | |
|---|---|---|---|
| 5,946,388 A | 8/1999 | Walker et al. | |
| 7,023,979 B1 | 4/2006 | Wu et al. | |
| 7,065,203 B1 | 6/2006 | Huart et al. | |
| 7,607,164 B2 * | 10/2009 | Vasishth | G06F 21/577 709/223 |
| 7,624,422 B2 * | 11/2009 | Williams | H04L 41/0853 726/1 |
| 7,627,891 B2 * | 12/2009 | Williams | H04L 63/1408 709/224 |
| 8,069,483 B1 | 11/2011 | Matlock | |
| 8,340,110 B2 | 12/2012 | Gast | |
| 8,499,331 B1 * | 7/2013 | Yehuda | H04L 41/5006 709/223 |
| 8,522,306 B2 * | 8/2013 | Lerner | G06F 9/546 726/1 |
| 9,042,914 B2 | 5/2015 | Harvey et al. | |
| 9,338,176 B2 | 5/2016 | Trumbull et al. | |
| 9,349,015 B1 | 5/2016 | Archer et al. | |

(Continued)

OTHER PUBLICATIONS

Big-IP® Access Policy Manager®: Implementations, Version 12.0, F5 Networks, Inc., 2015, pp. 1-108.

(Continued)

*Primary Examiner* — Hosuk Song
(74) *Attorney, Agent, or Firm* — Pepper Hamilton LLP

(57) ABSTRACT

Methods, non-transitory computer readable media, and mobile application manager apparatus that assists with deterministic enforcement of compliance policy includes receiving one or more compliance policy changes. An estimated time to enforce the received one or more compliance policy changes on one or more enrolled mobile devices is identified. It is determined whether the identified estimated time to enforce the received one or more compliance policy changes is acceptable based on one or more stored parameters. The received one or more compliance policy changes on the one or more enrolled mobile devices is enforced when the identified estimated time is determined to be acceptable and updating existing one or more compliancy policies with the received one or more compliance policy changes.

24 Claims, 5 Drawing Sheets

(56) References Cited

U.S. PATENT DOCUMENTS

| | | |
|---|---|---|
| 9,363,675 B2 | 6/2016 | Chuang et al. |
| 10,015,197 B2 | 7/2018 | Bai et al. |
| 2004/0193912 A1 | 9/2004 | Li et al. |
| 2005/0138371 A1 | 6/2005 | Supramaniam et al. |
| 2005/0204162 A1 | 9/2005 | Rayes et al. |
| 2005/0273841 A1 | 12/2005 | Freund |
| 2007/0143851 A1 | 6/2007 | Nicodemus et al. |
| 2009/0254969 A1 | 10/2009 | Parker et al. |
| 2010/0138921 A1 | 6/2010 | Na et al. |
| 2010/0161773 A1 | 6/2010 | Prahlad et al. |
| 2012/0005347 A1 | 6/2012 | Chen et al. |
| 2012/0023190 A1 | 6/2012 | Backholm et al. |
| 2014/0006772 A1 | 1/2014 | Qureshi et al. |
| 2014/0189804 A1 | 6/2014 | Lehmann et al. |
| 2014/0337607 A1 | 11/2014 | Peterson et al. |
| 2015/0241941 A1 | 8/2015 | Luna et al. |
| 2016/0088475 A1 | 3/2016 | Zhang |
| 2016/0226913 A1 | 8/2016 | Sood et al. |

OTHER PUBLICATIONS

Big-IP® Analytics: Implementations, version 12.0, Sep. 1, 2015, F5 Networks, Inc., pp. 1-50.

Big-IP® Application Security Manager™: Implementations, Version 12.0, F5 Networks, Inc., 2015-2016, pp. 1-352.

F5 Networks, Inc., "BIG-IP APM", Release Notes, Aug. 9, 2016, pp. 1-9, version 11.6.1, F5 Networks, Inc.

F5 Networks, Inc., "BIG-IP APM 11.4.1", Release Notes, Nov. 7, 2014, Version 11.4.1.

F5 Networks, Inc., "BIG-IP® Access Policy Manager® Authentication Configuration Guide", Manual, Sep. 17, 2013, pp. 1-201, Version 11.4.

F5 Networks, Inc., "BIG-IP® Access Policy Manager®: Application Access Guide", Manual, Jun. 11, 2013, pp. 1-26, Version 11.4.

F5 Networks, Inc., "BIG-IP® Access Policy Manager®: Application Access", Manual, Aug. 25, 2014, pp. 1-50, version 11.6, F5 Networks, Inc.

F5 Networks, Inc., "BIG-IP® Access Policy Manager®: Authentication and Single Sign-On", Manual, Aug. 25, 2014, pp. 1-308, version 11.6, F5 Networks, Inc.

F5 Networks, Inc., "BIG-IP® Access Policy Manager®: Edge Client® and Application Configuration", Manual, Aug. 25, 2014, pp. 1-66, version 11.6, F5 Networks, Inc.

F5 Networks, Inc., "BIG-IP® Access Policy Manager®: Implementations", Manual, Aug. 25, 2014, pp. 1-98, version 11.6, F5 Networks, Inc.

F5 Networks, Inc., "BIG-IP® Access Policy Manager®: Secure Web Gateway Implementations", Manual, Aug. 25, 2014, pp. 1-160, version 11.6, F5 Networks, Inc.

F5 Networks, Inc., "Configuration Guide for BIG-IP® Access Policy Manager®", Manual, Sep. 30, 2013, pp. 1-369, Version 11.4.

F5 Networks, Inc., "F5 BIG-IP Access Policy Management Operations Guide", Manual, May 5, 2015, pp. 1-168.

* cited by examiner

METHODS FOR DETERMINISTIC ENFORCEMENT OF COMPLIANCE POLICIES AND DEVICES THEREOF

This application claims the benefit of U.S. Provisional Patent Application Ser. No. 62/280,751, filed Jan. 20, 2016 which is hereby incorporated by reference in its entirety.

FIELD

This technology generally relates to methods and devices for network traffic management and, more particularly, to methods for deterministic enforcement of compliance policies and devices thereof.

BACKGROUND

With prior technologies, compliance policy checks are periodically enforced on mobile devices. Typically, these compliance checks involve adding or deleting mobile applications and/or security policies on mobile devices based on administrator configured compliance policies. These prior technologies allow the administrator to configure the duration of executing the compliance policies, but the actual duration of execution of the compliance policies varies based on several parameters, such as configuration of the compliance policy, system capacity and the number of enrolled devices. By way of example, if the execution of the configured compliance policy would involve heavy active directory query as well as the need to retrieve and process a substantial amount of information from the enrolled mobile devices, then the particular time when the execution of the configured compliancy policy is scheduled may be based on the current and/or expected load on the system. Unfortunately, when for example an immediate change to address a security issue is needed, this type of scheduling is problematic and not effective for insuring compliance with the newly configured policy.

SUMMARY

A method for assisting with deterministic enforcement of compliance policy comprising one or more network traffic apparatuses, client devices, or server devices includes receiving one or more compliance policy changes. An estimated time to enforce the received one or more compliance policy changes on one or more enrolled mobile devices is identified. A determination is made on when the identified estimated time to enforce the received one or more compliance policy changes is acceptable based on one or more stored parameters. The received one or more compliance policy changes on the one or more enrolled mobile devices are enforced when the identified estimated time is determined to be acceptable and updating existing one or more compliancy policies with the received one or more compliance policy changes.

A non-transitory computer readable medium having stored thereon instructions for deterministic enforcement of compliance policy comprising machine executable code which when executed by at least one processor, causes the processor to perform steps including receiving one or more compliance policy changes. An estimated time to enforce the received one or more compliance policy changes on one or more enrolled mobile devices is identified. It is determined whether the identified estimated time to enforce the received one or more compliance policy changes is acceptable based on one or more stored parameters. The received one or more compliance policy changes on the one or more enrolled mobile devices is enforced when the identified estimated time is determined to be acceptable and updating existing one or more compliancy policies with the received one or more compliance policy changes.

A network administrator computing device including one or more processors coupled to a memory and configured to be capable of executing programmed instructions comprising and stored in the memory to receiving one or more compliance policy changes. An estimated time to enforce the received one or more compliance policy changes on one or more enrolled mobile devices is identified. It is determined whether the identified estimated time to enforce the received one or more compliance policy changes is acceptable based on one or more stored parameters. The received one or more compliance policy changes on the one or more enrolled mobile devices is enforced when the identified estimated time is determined to be acceptable and existing updating one or more compliancy policies with the received one or more compliance policy changes.

This technology provides a number of advantages including providing methods, non-transitory computer readable media and apparatuses that effectively assist with deterministic enforcement of compliance policy. Using the claimed technology, a compliance policy can be enforced on enrolled devices quickly and using less computing resources because the number of devices that will be affected by the change to the compliance policy will be known before the compliance policy is enforced. By knowing the number of affected devices, the time to enforce the compliance policy can also be determined prior to enforcing the compliance policy on the enrolled devices.

DETAILED DESCRIPTION

Figure 1:
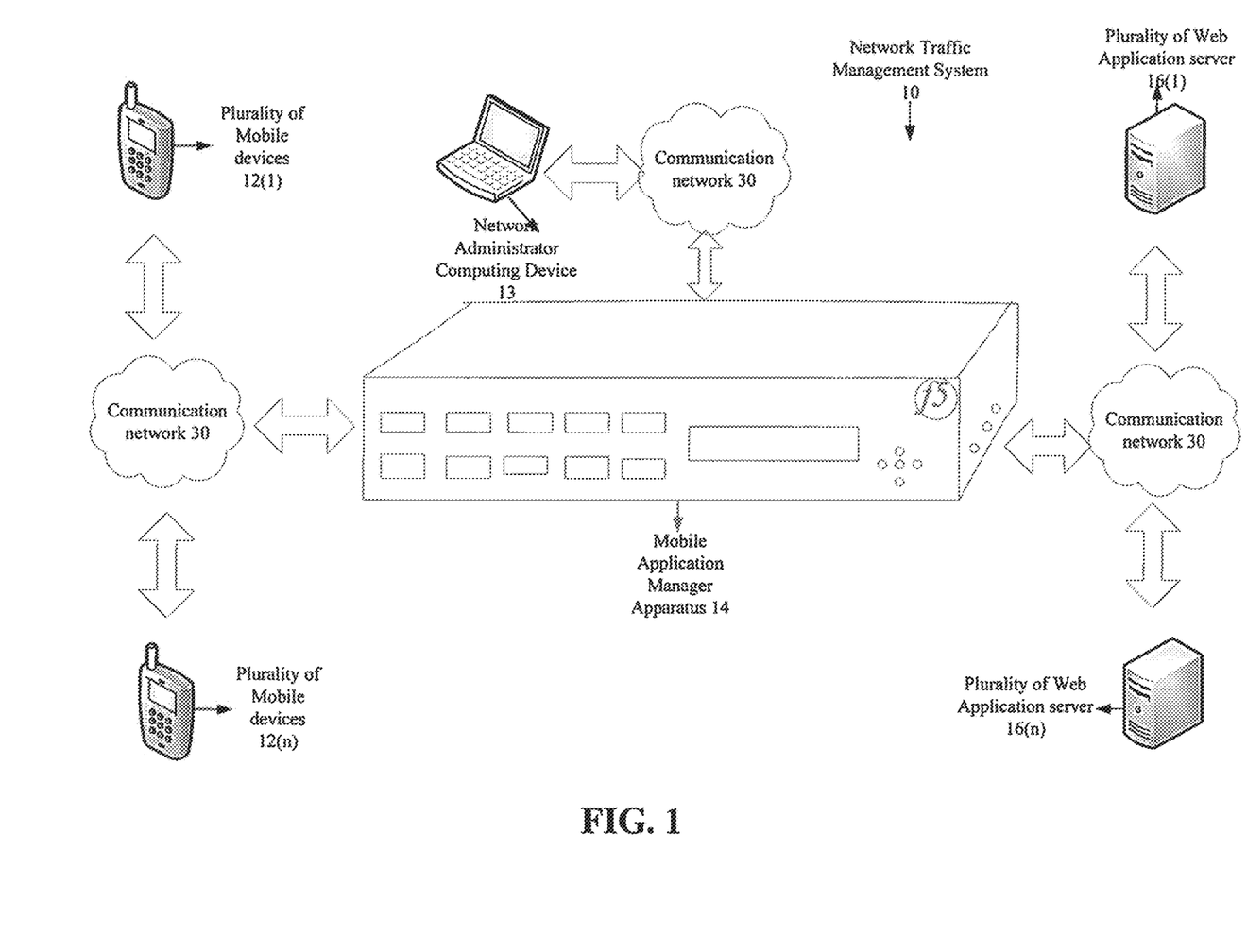
FIG. 1 is an example of a block diagram of an environment including a mobile application manager apparatus for deterministic enforcement of compliance policies.
Figure 2:
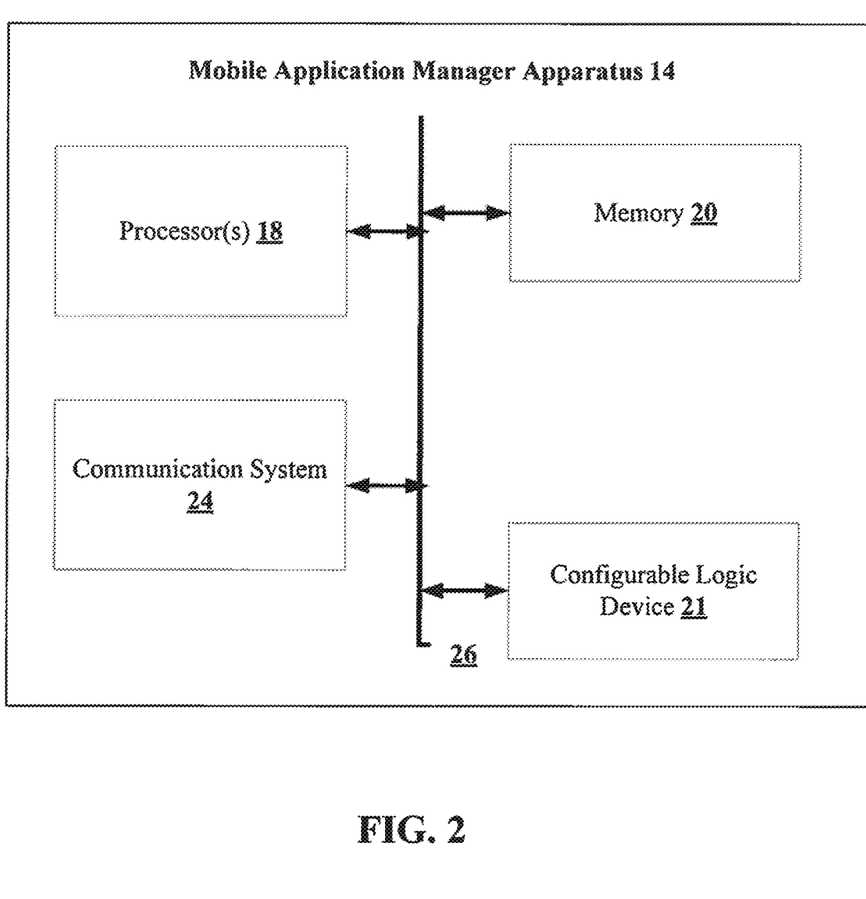
FIG. 2 is an example of a block diagram of the mobile application manager apparatus.

An example of a network environment 10 which incorporates a network traffic management system for deterministic enforcement of compliance policies with the mobile application manager apparatus 14 is illustrated in FIGS. 1 and 2. The exemplary environment 10 includes a plurality of mobile computing devices 12(1)-12(n), a network administrator computing device 13, a mobile application manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing an effective and efficient deterministic enforcement of one or more compliance policies.

Referring more specifically to FIGS. 1 and 2, the mobile application manager apparatus 14 of the network traffic management system is coupled to the plurality of mobile computing devices 12(1)-12(n) through the communication network 30, although the plurality of mobile computing devices 12(1)-12(n) and mobile application manager apparatus 14 may be coupled together via other topologies. Additionally, the mobile application manager apparatus 14 is coupled to the plurality of web application servers 16(1)-16(n) through the communication network 30, although the web application servers 16(1)-16(n) and the mobile application manager apparatus 14 may be coupled together via other topologies. Further, the mobile application manager apparatus 14 is coupled to the network administrator computing device 13 through the communication network 30, although the network administrator computing device 13 and mobile application manager apparatus 14 may be coupled together via other topologies The mobile application manager apparatus 14 assists with deterministic enforcement of compliance policies as illustrated and described by way of the examples herein, although the mobile application manager apparatus 14 may perform other types and/or numbers of functions. As illustrated in FIG. 2, the mobile application manager apparatus 14 includes processor or central processing unit (CPU) 18, memory 20, optional configurable hardware logic 21, and a communication system 24 which are coupled together by a bus device 26 although the mobile application manager apparatus 14 may comprise other types and numbers of elements in other configurations. In this example, the bus 26 is a PCI Express bus in this example, although other bus types and links may be used.

The processors 18 within the mobile application manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
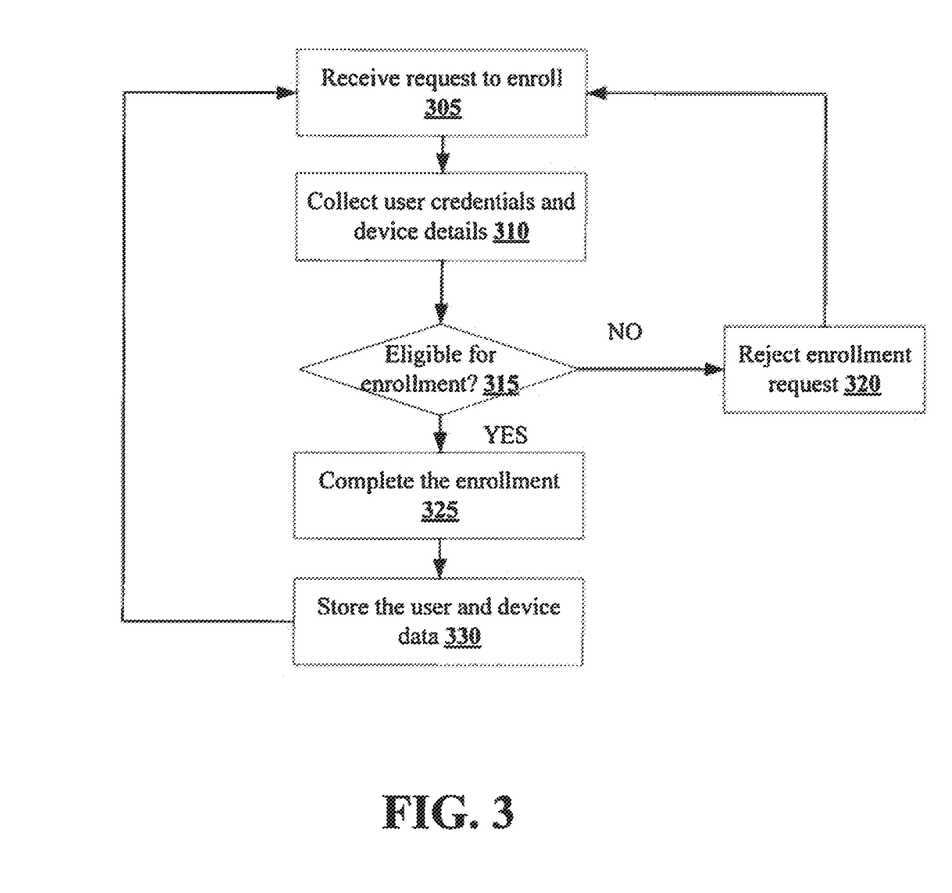
FIG. 3 is an exemplary flowchart of a method of enrolling a plurality of mobile devices using the example of a mobile application manager apparatus.
Figure 4:
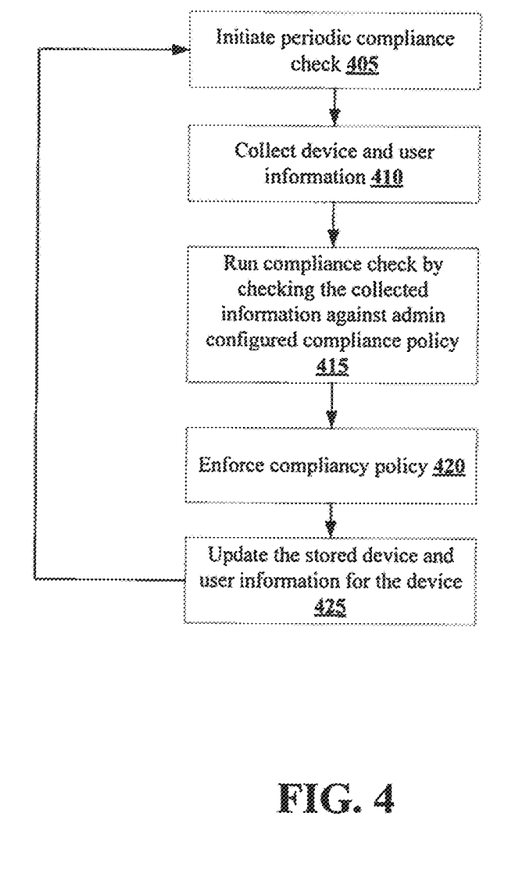
FIG. 4 is an exemplary flowchart of a method for performing the periodic compliance check.
Figure 5:
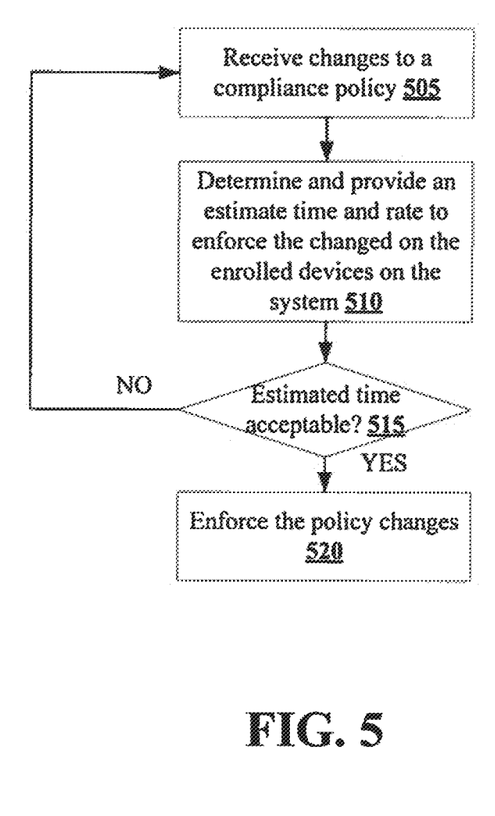
FIG. 5 is an exemplary flowchart of a method for deterministic enforcement of compliance policies on one or more enrolled mobile devices.

The memory 20 within the mobile application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-5 are representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the mobile application manager apparatus 14 can store one or more applications that can include computer executable instructions that, when executed by the mobile application manager apparatus 14, causes the mobile application manager apparatus 14 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the mobile application manager apparatus 14 itself, may be located in virtual server(s) running in a cloud-based computing environment rather than being tied to one or more specific physical network computing devices. Also, the application(s) may be running in one or more virtual machines (VMs) executing on the mobile application manager apparatus 14. Additionally, in at least one of the various embodiments, virtual machine(s) running on the network administrator computing device may be managed or supervised by a hypervisor.

The optional configurable hardware logic device 21 in the mobile application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the mobile application manager apparatus 14 is used to operatively couple and communicate between the mobile application manager apparatus 14, the plurality of mobile computing devices 12(1)-12(n), the network administrator computing device 13, and the web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of mobile computing devices 12(1)-12(n) of the network traffic management system, include a central processing unit (CPU) or processor, a memory, input/display device interface, configurable logic device and an input/output system or I/O system, which are coupled together by a bus or other link. The plurality of mobile computing devices 12(1)-12(n), in this example, may run interface applications, such as Web browsers, that may provide an interface to make requests for and send and/or receive data to and/or from the web application servers 16(1)-16(n) via the mobile application manager apparatus 14. Additionally, the plurality of mobile computing devices 12(1)-12(n) can include any type of computing device that can receive, render, and facilitate user interaction, such as client computers, network computer, mobile computers, virtual machines (including cloud-based computer), or the like. Each of the plurality of mobile computing devices 12(1)-12(n) utilizes the mobile application manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The network administrator computing device 13 of the network traffic management system include a central processing unit (CPU) or processor, a memory, and a communication system, which are coupled together by a bus or other link, although other numbers and/or types of network devices could be used. Generally, the network administrator computing device 13 process requests for providing changes to compliance policies, receive estimated time to enforce the compliance policy changes received from the mobile application manager apparatus 14, via the communication network 30 according to the HTTP-based application RFC protocol or the CIFS or NFS protocol in this example, but the principles discussed herein are not limited to this example and can include other application protocols. A series of applications may run on the network administrator computing device 13 that allows the transmission of data requested by the mobile application manager apparatus 14. It is to be understood that the network administrator computing device 13 may be hardware or software or may represent a system with multiple external resource servers, which may include internal or external networks.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of mobile computing devices 12(1)-12(n), mobile application manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of mobile computing devices 12(1)-12(n), or the mobile application manager apparatus 14. The plurality of web application servers 16(1)-16(n) may provide data or receive data in response to requests directed toward the respective applications on the plurality web application servers 16(1)-16(n) from the plurality of mobile computing devices 12(1)-12(n) or the mobile application manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, one or more actions of the network administrator computing device 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within mobile application manager apparatus 14 rather than as a stand-alone server communicating with mobile application manager apparatus 14 via the communication network(s) 30. In this example the plurality of web application servers 16(1)-16(n) operate within the memory 20 of the mobile application manager apparatus 14.

While mobile application manager apparatus 14 is illustrated in this example as including a single device, mobile application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise mobile application manager apparatus 14 in other examples can be standalone devices or integrated with one or more other devices or applications, such as one of the network administrator computing device 13, plurality of web application servers 16(1)-16(n) or, the mobile application manager apparatus 14, or applications coupled to the communication network(s), for example. Moreover, one or more of the devices of mobile application manager apparatus 14 in these examples can be in a same or a different communication network 30 including one or more public, private, or cloud networks, for example.

Although an exemplary network traffic management system 10 with the plurality of mobile computing devices 12(1)-12(n), the network administrator computing device 13, the mobile application manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as mobile application manager apparatus 14, plurality of mobile computing devices 12(1)-12(n), the network administrator computing device 13 or the plurality of web application servers 16(1)-16(n), for example, may be configured to operate as virtual instances on the same physical machine. In other words, one or more of mobile application manager apparatus 14, the network administrator computing device 13, plurality of mobile computing devices 12(1)-12(n), or plurality of web application servers 16(1)-16(n) illustrated in FIG. 1 may operate on the same physical device rather than as separate devices communicating through a network as depicted in FIG. 1. There may be more or fewer plurality of mobile computing devices 12(1)-12(n), network administrator computing device 13, mobile application manager apparatus 14, or the plurality of web application servers 16(1)-16(n) than depicted in FIG. 1. The plurality of mobile computing devices 12(1)-12(n), the network administrator computing device 13, or the plurality of web application servers 16(1)-16(n) could be implemented as applications on mobile application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for deterministic enforcement of compliance policies on the enrolled mobile devices will now be described with reference to FIGS. 1-5. First, an exemplary illustration of a method for enrolling one or more mobile devices will now be illustrated with reference to FIG. 3.

In step 305, the mobile application manager apparatus 14 receives an enrollment request from one of the plurality of mobile devices 12(1)-12(n), although the mobile application manager apparatus 14 can receive other types or amounts of request and/or other information from the plurality of mobile devices 12(1)-12(n). By way of example only, the mobile application manager apparatus 14 may receive user credentials of the user and the device details of the requesting one of the plurality of mobile devices 12(1)-12(n) as the enrollment information, although the mobile application manager apparatus 14 can receive other types and/or amounts of information from the requesting one of the plurality of mobile devices 12(1)-12(n).

Next in step 310, the mobile application manager apparatus 14 obtains data associated with the user identity and the requesting one of the plurality of mobile devices 12(1)-12(n). In this example, data associated with the user includes a role of the user of the requesting one of the plurality of mobile devices 12(1)-12(n) and/or a group or other division within an organization that the user of the requesting one of the plurality of mobile devices 12(1)-12(n) is assigned to, although data associated with the user can include other types or amounts of information associated with the user of the requesting one of the plurality of mobile devices 12(1)-12(n). Additionally in this example, the data associated with the requesting one of the plurality of mobile devices 12(1)-12(n) may include geographic location information, the application sending the request, the web browser, the stand-alone application being used to access the web application, the IP address, the type of the requesting device, and/or the current operating system on the requesting one of the plurality of mobile devices 12(1)-12(n) by way of example.

Next in step 315, the mobile application manager apparatus 14 performs an authentication check based on the obtained information to determine whether to allow the requesting one of the plurality of mobile devices 12(1)-12(n) to enroll, although the mobile application manager apparatus 14 can perform the authentication check using other types and/or amounts of information and in other manners. In this example, the mobile application manager apparatus 14 compares the received information associated with the requesting one of the plurality of mobile devices 12(1)-12(n) against existing access control checks to determine when to enroll the requesting one of the plurality of mobile devices 12(1)-12(n), although the mobile application manager apparatus 14 can perform the authentication checks using other types of techniques. By way of example, the mobile application manager apparatus 14 may determine whether to provide enrollment based on the setting of requesting one of the plurality of mobile devices 12(1)-12(n). Accordingly, when the mobile application manager apparatus 14 determines that the requesting one of the plurality of mobile devices 12(1)-12(n) should not be enrolled, then the No branch is taken to step 320.

In step 320, the mobile application manager apparatus 14 rejects the received request for enrollment and the exemplary flow proceeds to step 305 where the mobile application manager apparatus 14 may receive the next request.

However, if back in step 315 the mobile application manager apparatus 14 determines that the requesting one of the plurality of mobile devices 12(1)-12(n) should be allowed to enroll, then the Yes branch is taken to step 325. In step 325, the mobile application manager apparatus 14 may complete the enrollment of the requesting one of the plurality of mobile devices 12(1)-12(n).

Next in step 330, the mobile application manager apparatus 14 may store the collected user and device data within the memory 20, although the mobile application manager apparatus 14 can store the data at other memory locations.

Next, an exemplary method for performing a periodic compliance check will now be illustrated with reference to FIGS. 1-2 and 4. In step 405, the mobile application manager apparatus 14 initiates a periodic compliance check at a prescheduled time, although the mobile application manager apparatus 14 can initiate the compliance check in other manners, such as on a nonperiodic basis and based on other types and/or numbers of parameters.

Next in step 410, the mobile application manager apparatus 14 obtains the user and device data associated with the user and their associated plurality of mobile devices using the technique illustrated above in step 310, although the mobile application manager apparatus 14 can use other types of techniques to obtain the information.

In step 415, the mobile application manager apparatus 14 performs a compliance check by comparing the obtained device and user data against the compliance policy that was configured by a network administrator, although the mobile application manager apparatus 14 can perform the compliance check using other techniques. By performing the compliance check, the mobile application manager apparatus 14 is able to identify any of the plurality of mobile devices 12(1)-12(n) which are deviating from the compliance policy. Optionally, the mobile application manager apparatus 14 can perform the compliance policy check by querying an active directory to receive and process the information associated with the enrolled plurality of mobile devices 12(1)-12(n), such as a user's role, a user's group, and/or other types of data associated with the user's of the enrolled plurality of mobile devices by way of example only.

Next in step 420, the mobile application manager apparatus 14 enforces the one or more compliance policies on the identified ones of the plurality of mobile devices 12(1)-12(n) that are deviating from the compliance policies, although the mobile application manager apparatus 14 can enforce the one or more compliance policies in other manners, such as on all of the plurality of mobile devices 12(1)-12(n).

Next in step 425, the mobile application manager apparatus 14 updates the user and device data stored in the memory 20 of the mobile application manager apparatus 14 based on the compliance policies that were enforced back in step 420 including marking or otherwise identifying the plurality of mobile devices 12(1)-12(n) on which the one or more compliance policies were enforced as being compliant. In this example, the mobile application manager apparatus 14 updates all the information associated with the user and the device, although other types and/or amounts of information could be updated.

Next, an example of a method for deterministic enforcement of compliance policies on the enrolled mobile devices will be illustrated with reference to FIGS. 1-2 and 5. In step 505, the mobile application manager apparatus 14 receives one or more changes to the compliance policies from the network administrator computing device 13, although the mobile application manager apparatus 14 can receive the changes to the compliance policies from other devices. By way of example only, the changes may relate to installing or uninstalling mobile applications, requesting additional changes to the security policies installed on the plurality of mobile devices, requiring additional level of authentication, such as client certification by way of example only, providing or terminating access to web applications, and/or requiring an upgrade or downgrade of the operating system on the enrolled plurality of mobile device(s) that are responsible for the detected threat by way of example, although other types and/or numbers of changes to the compliance policies can be received.

Next in step 510, the mobile application manager apparatus 14 determines an estimated time and rate to enforce the received one or more compliance policy changes on the plurality of mobile device(s) 12(1)-12(n). In this example the mobile application manager apparatus 14 determines the estimated time and the rate based on one or more stored parameters, such as a number of active directory enquiries required to enforce the one or more policy changes, a number of command execution required to make changes on one or more of the identified ones of the plurality of mobile device(s) 12(1)-12(n), a number of plurality of mobile devices 12(1)-12(n) that are affected based on the received compliance policy changes, and/or a current capacity of the mobile application manager apparatus 14 by way of example, although the mobile application manager apparatus 14 can determine the estimated time and rate based on other types and/or numbers of parameters or other factors, such as processor speed, network bandwidth, or the like by way of example only. Further, the mobile application manager apparatus 14 may provide the determined estimated time and the rate to the network administrator computing device 13.

In step 515, the mobile application manager apparatus 14 determines when the estimated time and rate to enforce the received compliancy policy changes is acceptable. By way of example, the mobile application manager apparatus 14 can determine that the estimated time is acceptable based on data received from the network administrator computing device 13 or by comparing the estimated time against a threshold time, although the mobile application manager apparatus 14 can use other techniques make the determination. Accordingly, when the mobile application manager apparatus 14 determines that the estimated time is not acceptable, then the No branch is taken back to step 505 where the mobile application manager apparatus 14 receives the revised changes to the compliance policy.

However, if back in step 515 the mobile application manager apparatus 14 determines that the estimated time is acceptable, then the Yes branch is taken to step 520. In step 520, the mobile application manager apparatus 14 proceeds to enforce the received changes to the compliance policy on the plurality of mobile devices 12(1)-12(n) and the exemplary method ends. Additionally in this example, the mobile application manager apparatus 14 stores and updates the compliancy policy with the received changes that was initially received in step 505.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for deterministic enforcement of one or more compliance policies implemented by a network traffic management system comprising one or more network traffic apparatuses, client devices, or server devices, the method comprising:

receiving one or more compliance policy changes;

identifying an estimated time and execution rate to enforce the received one or more compliance policy changes on one or more enrolled mobile devices;

determining when the identified estimated time and execution rate to enforce the received one or more compliance policy changes is acceptable based on one or more stored parameters; and enforcing the received one or more compliance policy changes on the one or more enrolled mobile devices when the identified estimated time and execution rate is determined to be acceptable and updating existing one or more compliancy policies with the received one or more compliance policy changes.

2. The method as set forth in claim 1 wherein the determining further comprises determining when the identified estimated time to enforce the received one or more compliance policy changes is greater than or equal than a threshold time.

3. The method as set forth in claim 2 further comprising receiving one or more revised compliance policy changes when the determining indicates that the identified estimated time is greater than or equal to the threshold time.

4. The method as set forth in claim 3 further comprising identifying a revised estimated time to enforce the received one or more revised compliance policy changes.

5. The method as set forth in claim 4 further comprising:
   determining when the identified revised estimated time is less than the threshold time; and
   enforcing the received one or more revised compliance policy changes on the one or more enrolled mobile devices when the identified revised estimated time is determined to be less than the threshold time.

6. The method as set forth in claim 1 further comprising performing a compliance check on the one or more enrolled mobile devices upon enforcing the received one or more compliance policy changes.

7. A non-transitory computer readable medium having stored thereon instructions for deterministic enforcement of compliance policies comprising executable code which when executed by one or more processors, causes the processors to:
   receive one or more compliance policy changes;
   identify an estimated time and execution rate to enforce the received one or more compliance policy changes on one or more enrolled mobile devices;
   determine when the identified estimated time and execution rate to enforce the received one or more compliance policy changes is acceptable based on one or more stored parameters; and
   enforce the received one or more compliance policy changes on the one or more enrolled mobile devices when the identified estimated time and execution rate is determined to be acceptable and updating existing one or more compliancy policies with the received one or more compliance policy changes.

8. The medium as set forth in claim 7 wherein the determining further comprises determine when the identified estimated time to enforce the received one or more compliance policy changes is greater than or equal than a threshold time.

9. The medium as set forth in claim 8 further comprising receive one or more revised compliance policy changes when the identified estimated time is greater than or equal to the threshold time.

10. The medium as set forth in claim 9 further comprising identify a revised estimated time to enforce the received one or more revised compliance policy changes.

11. The medium as set forth in claim 10 further comprising:
    determine when the identified revised estimated time is less than the threshold time; and
    enforce the received one or more revised compliance policy changes on the one or more enrolled mobile devices when the identified revised estimated time is determined to be less than the threshold time.

12. The medium as set forth in claim 7 further comprising perform a compliance check on the one or more enrolled mobile devices upon enforcing the received one or more compliance policy changes.

13. A mobile application manager apparatus, comprising memory comprising programmed instructions stored in the memory and one or more processors configured to be capable of executing the programmed instructions stored in the memory to:
    receive one or more compliance policy changes;
    identify an estimated time and execution rate to enforce the received one or more compliance policy changes on one or more enrolled mobile devices;
    determine when the identified estimated time and execution rate to enforce the received one or more compliance policy changes is acceptable based on one or more stored parameters; and
    enforce the received one or more compliance policy changes on the one or more enrolled mobile devices when the identified estimated time and execution rate is determined to be acceptable and updating existing one or more compliancy policies with the received one or more compliance policy changes.

14. The device as set forth in claim 13 wherein the one or more processors are further configured to be capable of executing the programmed instructions stored in the memory wherein the determining further comprises determine when the identified estimated time to enforce the received one or more compliance policy changes is greater than or equal a threshold time.

15. The device as set forth in claim 14 wherein the one or more processors are further configured to be capable of executing the programmed instructions stored in the memory to receive one or more revised compliance policy changes when the identified estimated time is greater than or equal to the threshold time.

16. The device as set forth in claim 15 wherein the one or more processors are further configured to be capable of executing the programmed instructions stored in the memory to identify a revised estimated time to enforce the received one or more revised compliance policy changes.

17. The device as set forth in claim 16 wherein the one or more processors are further configured to be capable of executing the programmed instructions stored in the memory to:
    determine when the identified revised estimated time is less than the threshold time; and
    enforce the received one or more revised compliance policy changes on the one or more enrolled mobile devices when the identified revised estimated time is determined to be less than the threshold time.

18. The device as set forth in claim 13 wherein the one or more processors are further configured to be capable of executing the programmed instructions stored in the memory to perform a compliance check on the one or more enrolled mobile devices upon enforcing the received one or more compliance policy changes.

19. A network traffic management system, comprising one or more traffic management apparatuses, client devices, or server devices, the network traffic management system comprising memory comprising programmed instructions stored thereon and one or more processors configured to be capable of executing the stored programmed instructions to:
    receive one or more compliance policy changes;
    identify an estimated time and execution rate to enforce the received one or more compliance policy changes on one or more enrolled mobile devices;

determine when the identified estimated time and execution rate to enforce the received one or more compliance policy changes is acceptable based on one or more stored parameters; and enforce the received one or more compliance policy changes on the one or more enrolled mobile devices when the identified estimated time and execution rate is determined to be acceptable and updating existing one or more compliancy policies with the received one or more compliance policy changes.

20. The network traffic management system of claim 19, wherein the one or more processors are further configured to be capable of executing the programmed instructions stored in the memory wherein the determining further comprises determine when the identified estimated time to enforce the received one or more compliance policy changes is greater than or equal than a threshold time.

21. The network traffic management system of claim 20, wherein the one or more processors are further configured to be capable of executing the programmed instructions stored in the memory to receive one or more revised compliance policy changes when the identified estimated time is greater than or equal to the threshold time.

22. The network traffic management system of claim 21 wherein the one or more processors are further configured to be capable of executing the programmed instructions stored in the memory to identify a revised estimated time to enforce the received one or more revised compliance policy changes.

23. The network traffic management system of claim 19 wherein the one or more processors are further configured to be capable of executing the programmed instructions stored in the memory to:

determine when the identified revised estimated time is less than the threshold time; and enforce the received one or more revised compliance policy changes on the one or more enrolled mobile devices when the identified revised estimated time is determined to be less than the threshold time.

24. The network traffic management system of claim 19 wherein the one or more processors are further configured to be capable of executing the programmed instructions stored in the memory to perform a compliance check on the one or more enrolled mobile devices upon enforcing the received one or more compliance policy changes.

* * * * *